United States Patent Office 3,053,147
Patented Sept. 11, 1962

3,053,147
CIRCULAR LIGHT POLARIZER
Elkan R. Blout, Belmont, Mass., assignor to Polaroid Corporation, Cambridge, Mass., a corporation of Delaware
No Drawing. Filed Nov. 16, 1959, Ser. No. 852,990
11 Claims. (Cl. 88—65)

This invention relates to a new type of circular light polarizer and to a method of producing the same.

In the past, formation of a circular light polarizer has, in general, involved properly assembling a λ/4 plate with a plane light-polarizing means. In thus forming a circular polarizer, the optic axis of the plate and the polarizing directions of the polarizing means are relatively disposed in a manner known to the art to provide either a right-handed or a left-handed circular polarizer, as may be required.

The present invention contemplates an entirely different type of circular light polarizer for substantially any region of the electromagnetic spectrum, namely, one which is produced through the chemical association, structure and arrangement of its molecular components, resulting in properties of a functional optical nature therein. The method involves the formation of certain complexes comprising light-absorbing molecules with substantially uniformly oriented helical macromolecules. More particularly, the preferred complexes comprise helical polypeptide:anionic or cationic azo dye complexes providing optical rotatory dispersions which are significantly different from those of the random coil polypeptides, alone, or in association with the dye. Polypeptides found to be particularly suitable for the purpose are synthetic polypeptides, of which the acidic polypeptide, poly-α-L-glutamic acid (PGA), and the basic polypeptide, poly-α-L-lysine, are examples. Instead of the synthetic polypeptides, natural proteins may be employed with proper dyes to form complexes of a generally similar functional nature. While the "L" amino acids are specifically referred to herein, it will be understood that the "D" amino acids may be used to make polypeptides, e.g., poly-α-D-glutamic acid, and when this is done the opposite sense of helix and of circular dichroism is produced.

In accordance with the foregoing considerations, an object of the present invention is to provide a new type of circular light polarizer in the form of a complex composed of light-absorbing molecules with proper helical macromolecules.

Other objects are to provide a film material, comprising substantially uniformly oriented helical polypeptide macromolecules, adapted to become circularly light-polarizing when treated with a proper dye; to provide a film of the character described in which, in one instance, the macromolecules are so oriented as to lie substantially parallel with the film plane and, in another instance, to be disposed substantially vertically relative thereto; to provide a circular light polarizer composed substantially of an acidic helical polypeptide:basic dye complex or of a basic helical polypeptide:acidic dye complex; to provide a circular polarizer of the character described wherein an acidic helical polypeptide such as poly-α-L-glutamic acid, or a basic helical polypeptide such as poly-α-L-lysine is employed; to provide a circular polarizer of the character described in which the dye component of the complex is an anionic or a cationic azo dye having substantially any desired absorption characteristic; and to provide a circular polarizer, as described, wherein the final film structure may, for example, be in the form of a thin section cut transversely from a stack of individual films, laminated together and comprising helical polypeptide molecules, each of which films has previously been stretched or otherwise treated to provide a given molecular orientation therein; or in the form of a thin section cut transversely from a rod-like element in which the helical polypeptide molecules have been generally uniformly aligned during flow of the substance making up the rod-like element prior to its solidification; or in the form of a cast or otherwise produced film wherein the molecules have assumed a disposition substantially at 90° to the plane of the film through subjection of the film surfaces, while still in a fluid state, to an electric field.

Other objects of the invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure and the scope of the application of which will be indicated in the claims.

For a fuller understanding of the nature and objects of the invention, reference should be had to the following detailed description.

In forming a circular light polarizer of the present invention, both optical rotatory dispersion, namely, the optical rotation as a function of wavelength, and circular dichroism as evidenced by a differential absorption of right- and left-handed circular vibrations with corresponding rotatory contribution (Cotton effect) are involved. Where $k_l$ and $k_r$ represent the molecular absorption coefficients of an optically active substance for left- and right-handed circularly polarized light, respectively, of a given frequency, $k_l - k_r$, as a function of the frequency, represents the circular dichroism and enables a determination of the molecular rotatory power of the substance for that frequency.

Assuming, for example, the relative difference of the absorption coefficients for left- and right-handed circularly polarized light to be in the region of an isolated or homogeneous absorption band, if $k_l > k_r$ the rotatory contribution is termed positive; if $k_l < k_r$ negative. The value of the circular dichroism can be indicated for an isolated absorption band from measurements of the optical rotation and of the ordinary light absorption. A positive or negative Cotton effect of a given absorption band may occur if the vibrating moment corresponding to the optical absorption band has nonparallel, noncoplanar components in mutually remote parts of the molecule. For a more complete presentation of the subject of optical rotary power and circular dichroism, reference may be had to the Annual Review of Physical Chemistry, Volume 9 (1958), pages 417–438, "Optical Rotatory Power," by Werner Kuhn.

The polypeptides and proteins, employed in forming the molecularly oriented complexes of the present invention, are polymers composed of α-amino acids joined through secondary amide (peptide) linkages. Both synthetic polypeptides and proteins have rotatory properties which depend on their amino acid composition and their molecular structure wherein, for example, each α-carbon atom is asymmetric.

A polypeptide chain in which the component amino acid residues have no periodic internal structure is in the random conformation, namely, there is a random spatial relationship of the groups comprised by the molecule. This is the condition when polypeptides are dissolved in strongly-hydrogen bonding solvents or when the pH of aqueous solutions of water-soluble ionic polypeptides has been adjusted for the purpose. Rotatory dispersions of polypeptides in the random conformations may be represented by either a positive plain curve or a negative plain curve. The present invention, however, is primarily concerned with the helical conformation wherein it has been considered that a polypeptide helix, due to its internal hydrogen bonding, is a cooperative unit, operating, optically, as a single absorbing system, namely, as an exciton system wherein the spreading of an absorption band characteristic is sufficient to cause the optical rotatory dispersion of helices to become anomalous. A polypeptide helix may have two senses of twist which are non-superimposable. One sense of helix is obtained from an L amino acid polymer, the opposite sense of helix from the corresponding D amino acid polymer.

When a non-optically active dye is bound to a helical polypeptide, it has been observed to be bound in an asymmetric manner. Thus, on passing through an absorption band of the dye, the Cotton effect may be observed in the vicinity of the absorption band. When, for example, the dye Acriflavine Neutral (C.I. 46000) (National Aniline Division, Allied Chemical & Dry Corp., New York) is bound to the helical form of poly-$\alpha$-L-glutamic acid, optical rotation in the neighborhood of the absorption band of the dye is greatly enhanced. For a further consideration of the factors which influence the configuration and helical conformation of macromolecules and, particularly, of polypeptides and proteins, namely, factors such as the nature and concentration of the solvent, temperature conditions, chain length, molecular weight, cross-linkages, etc., reference should be had to Optical Rotary Dispersion by C. Djerassi, Chapter 17, by Elkan R. Blout, McGraw-Hill Publishing Co., New York, N.Y., 1959.

The synthetic polypeptide poly-$\alpha$-L-glutamic acid exists in the random conformation above approximately pH 6 and in a helical conformation below approximately pH 4.9. Substantially all basic dyes bind to poly-$\alpha$-L-glutamic acid, as shown by equilibrium dialysis studies. Formation of a suitable dye:helical polypeptide complex for use in producing the circular light polarizer is given in the following example.

An aqueous solution of a dye:polypeptide complex was prepared from commercial Acriflavine Neutral (C.I. 46000) (National Aniline Division, Allied Chemical & Dye Corporation, New York, N.Y.) and a high molecular weight poly-$\alpha$-L-glutamic acid (PGA) polymer. The poly-$\alpha$-L-glutamic acid polymer was prepared from a sodium salt of the polymer which showed an intrinsic viscosity of 1.12 at a pH of 7.3 in 0.2 M sodium chloride (estimated molecular weight of 51,000). The pH of the solution of the poly-$\alpha$-L-glutamic acid:dye complex was adjusted to between 4.5 and 4.9, through the slow addition of 0.1 N and 1 N hydrochloric acid solutions with constant stirring. At this pH the dye:polypeptide complex assumed the helical conformation. Alternatively, the dye Rhodamine 6G (C.I. 45160) (E.I. du Pont de Nemours & Co., Wilmington, Delaware) was similarly employed in forming the complex.

Observations relating to the foregoing example were as follows. The dyes, alone, showed no optical rotation. The poly-$\alpha$-L-glutamic acid:dye complex (acid at pH 4.8) showed markedly anomalous rotatory dispersions or circular dichroism (Cotton effect) in the wave-length regions corresponding to the dye absorption bands, which exceeded those of the poly-$\alpha$-L-glutamic acid, alone, at a similar pH. The circular dichroism present indicated that the chromophoric group of the dye, namely, of a symmetrical molecule, had acquired asymmetry upon binding to an asymmetric helical macromolecule. The inflection points in optical rotatory curves indicate the absorbing moiety responsible for the anomaly, inasmuch as they show close agreement with the absorption maxima of the dyes. For example, poly-$\alpha$-L-glutamic acid: Rhodamine 6G (C.I. 45160) solutions exhibit several inflection points two of which are near absorption maxima at 496 and 529 millimicrons.

In contrast to the helical conformation obtaining when the polypeptide is at a low pH, substantially no anomalous dispersion is exhibited by the PGA:dye complex at a pH above 6. A large Cotton effect is possible with low dye concentrations and there appears to be strong evidence that an optically inactive substance contributes to the optical rotation upon binding to an asymmetrical substance.

It is to be understood that the change in the macromolecule, e.g., the polypeptide, from a random to a helical conformation by changing the solvent or adjusting the pH, can be effected therein by performing the operation either prior to or after association with the dye to form the complex. The solvent is water or, for example, may be a water:dioxane or other solution. Altering the pH is accomplished in the conventional manner by adding a mineral acid to lower or an alkaline material to raise.

Assuming the solution of the polypeptide (or protein): dye complex to contain macromolecules of proper configuration and a sufficient degree of helical conformation, the solution, in a substantially viscous state, is formed into a film and treated to align the helical molecules and thereby render the completed material circularly light polarizing throughout its area. This may be performed by one of the following operations, the choice depending to a large extent on structural and area considerations relating to the finished product. One method comprises casting, extruding or otherwise forming the viscous solution into a film employing a generally conventional means of the plastics industry for the purpose, such as a casting plate, belt or drum, an extrusion nozzle or the like, with proper heat-providing and air-circulation means for effecting the desired solidification. The film, thus provided, is then subjected to any suitable stretching or stress-applying means for orienting the helical molecules substantially in the direction of the applied stretch or stress. A plurality of the molecularly oriented films, with a suitable bonding fluid, e.g., a solution of water:dioxane interposed between each pair, is formed into a stack and subjected to compression at opposite external planar surfaces of the sheets. Thin sections are then sliced transversely of the stacked sheets to provide planar sheets, each sheet constituting a substantially uniform circular light polarizer with the helical macromolecules disposed vertically therein and viewed endwise in the direction of their axes. The specular region throughout which circular polarization occurs depends upon the absorption spectrum of the dye. Polarization may be achieved with substantially all classes of dyes in all regions of the spectrum.

A second method of obtaining molecular orientation comprises applying a frictional force, e.g., rubbing, to the film surface. A further method is that of flowing the viscous solution through a tube of chosen diameter, at a given rate, to align the helical molecules and very rapidly solidifying the fluid at a selected stage of its travel, as by the application of heat and air flow to effect rapid evaporation of the solvent. Transverse sections are then cut from the solidified body in the manner above-described with respect to the stacked sheets to provide the circular polarizer.

A further method contemplates casting the viscous solution on a proper planar surface and, while in the fluid state, subjecting opposite planar surfaces of the cast fluid to an electric field, e.g., a static electric field, to obtain a vertical orientation of the helical macromolecules relative to the plane of the cast solution. The complete area of the cast fluid, with the molecules thus held in alignments, is then subjected to rapid drying means, such as applications of heat and rapidly circulating air, to effect its solidification and conversion to a self-supporting film. The helical macromolecules are thus permanently disposed therein vertically with respect to the plane of the film. The casting surface, upon which the solution is dispensed, may be composed of a dielectric material or of a metal and, if the latter, the surface may, of itself, serve as an electrode element for providing the electric field.

Alternatively, a second film material may first be laid upon the casting surface and the solution of the complex spread thereupon. The second film material serves either as a temporary or permanent carrier for the solidified solution of complex and, if a permanent carrier, it is preferably transparent and properly chosen relative to its refractive index and bonding qualities with the solution. The capability of the last-named method to effect the desired molecular orientation relates to the dipole moment of a polypeptide helix and the ordered arrangement of polar groups in the α helix. For a further consideration of the relevant characteristics of the polypeptide α helix, reference may be had to "Dielectric Properties of Polypeptide Solutions II" by Akiyoski Wada, Journal of Chemical Physics, Volume 29, page 674 (1958), and "Dielectric Properties of Polypeptide Solutions III," by Akiyoski Wada, Journal of Chemical Physics, Volume 30, page 328 (1959).

While the foregoing subject matter has principally related to the use of the acidic polypeptide, poly-α-L-glutamic acid with either of two specified dyes, namely, Acriflavine Neutral (C.I. 46000) and Rhodamine 6G (C.I. 45160), it is to be understood that various other acid polypeptides as well as basic polypeptides, an example of the latter being poly-α-L-lysine, and natural proteins may be employed in capacities generally similar to those described. Substantially any complex formed of an acid dye:basic polypeptide or a basic dye:acid polypeptide may be utilized for forming the film material which is rendered circularly light polarizing by any of the several molecular-orientation procedures, outlined above.

Since certain changes may be made in the above product and process without departing from the scope of the invention herein involved, it is intended that all matter contained in the above description shall be interpreted as illustrative and not in a limiting sense.

What is claimed is:

1. The process of producing a circularly light-polarizing device from a dye:polymer complex including a polymer adapted, when treated in a given manner, to assume an anomalous helical conformation of its macromolecules and to provide, when complexed with said dye, circular dichroism in the wavelength region of the absorption band of the dye, said process comprising the steps of preparing an aqueous solution of a basic dye of a non-optically active type, preparing an aqueous solution of a polymer having rotatory properties in a generally random conformation and composed of α-amino acids joined through secondary amide linkages, said polymer being selected from the class consisting of synthetic polypeptides and natural proteins, combining said dye and polymer solutions to obtain an aqueous solution of a dye:polymer complex, treating said polymer in one of its states in solution alone and in solution with said dye as may be necessary to adjust the pH thereof to convert said random conformation to said anomalous helical conformation, shaping said dye:polymer complex solution into a film, solidfying said film, and applying at least one external force to said film to provide said circularly light-polarizing device in the form of a film wherein said anomalous helical macromolecules of said dye:polymer complex are predominantly uniformly aligned with their axes substantially normal to the plane of said film.

2. A process, as defined in claim 1, wherein said external force is provided by applying an electrical force adapted to align said helical macromolecules to opposite sides of said film prior to its complete solidification.

3. The process of producing a circularly light-polarizing sheet material from a dye:polymer complex including a polymer adapted, when treated in a given manner, to assume an anomalous helical conformation of its macromolecules and to provide, when complexed with said dye, circular dichroism in the wavelength region of the absorption band of the dye, said process comprising the steps of preparing an aqueous solution of a basic dye of a non-optically active type, preparing an aqueous solution of a polymer having rotatory properties in a generally random conformation and composed of α-amino acids joined through secondary amide linkages, said polymer being selected from the class consisting of synthetic polypeptides and natural proteins, combining said dye and polymer solutions to obtain an aqueous solution of a dye:polymer complex, treating said polymer at one of its states in solution alone and in solution with said dye as may be necessary to adjust the pH thereof so as not to exceed a pH of approximately 4.9 to convert said random conformation to said anomalous helical conformation, shaping said dye:polymer complex solution into a film, solidifying said film, applying a frictional force to surface portions of said film at one of its fluid and solidified stages to provide an alignment of its surface molecules in a given direction substantially parallel with the plane of said film, cutting sections of said film, bonding said sections together in stacked relation, and cutting the stacked sections transversely thereof to produce said circularly light-polarizing sheet material wherein the axes of the helical macromolecules contained in each film section thereof are substantially normal to the plane of said light-polarizing sheet material.

4. The process of producing a circularly light-polarizing sheet material from a dye:polymer complex including a polymer adapted, when treated in a given manner, to assume an anomalous helical conformation of its macromolecules and to provide, when complexed with said dye, circular dichroism in the wavelength region of the absorption band of the dye, said process comprising the steps of preparing an aqueous solution of a basic dye of a non-optically active type, preparing an aqueous solution of a polymer having rotatory properties in a generally random conformation and composed of α-amino acids joined through secondary amide linkages, said polymer being selected from the class consisting of synthetic polypeptides and natural proteins, combining said dye and polymer solutions to obtain an aqueous solution of a dye:polymer complex, treating the polymer at one of its states in solution alone and in solution with said dye as may be necessary to adjust the pH thereof so as not to exceed a pH of approximately 4.9 to convert said random conformation to obtain said anomalous helical conformation, shaping said dye:polymer complex solution into a film, solidifying said film, stretching said film in a given direction to provide an alignment of its molecules substantially parallel with the plane of said film, cutting sections of said film having similar dimensions, bonding said sections together in stacked relation to provide a multi-layered block thereof, slicing at 90° to the outer surface relatively thin layers from said block transversely thereof to produce said circularly light-polarizing sheet material wherein the axes of the helical macromolecules contained in each film section thereof are substantially normal to the plane of said light-polarizing sheet material.

5. A circularly light-polarizing sheet material comprising a complex of a polymer containing a multiplicity of helical macromolecules, said polymer being selected from the class consisting of synthetic polypeptides and natural proteins, with a dye, said helical macromolecules being substantially uniformly oriented in a direction at approximately 90° to a principal surface of said sheet material, the complex of said helical macromolecules and said dye showing circular dichroism, and said sheet material being circularly light-polarizing for light transmitted thereby substantially in the direction of orientation of said helical macromolecules.

6. A circularly light-polarizing sheet material, as defined in claim 5, wherein said polymer is an acid polypeptide and the dye is a basic dye.

7. A circularly light-polarizing sheet material, as defined in claim 5, wherein said polymer is a basic polypeptide and said dye is an acid dye.

8. A circularly light-polarizing sheet material, as defined in claim 5, wherein said polymer is the polypeptide poly-α-L-glutamic acid.

9. A circularly light-polarizing sheet material, as defined in claim 5, wherein said polymer is the polypeptide poly-α-D-glutamic acid.

10. A circularly light-polarizing sheet material, as defined in claim 5, wherein the pH of said polymer is below 4.9.

11. A circularly light-polarizing sheet material, as defined in claim 5, wherein said material is in the form of a plastic film material.

References Cited in the file of this patent

UNITED STATES PATENTS

| | | |
|---|---|---|
| 1,918,848 | Land et al. | July 18, 1933 |
| 2,017,705 | Sproxton | Oct. 15, 1935 |
| 2,246,087 | Bailey et al. | June 17, 1941 |
| 2,281,100 | Land | Apr. 28, 1942 |